United States Patent

Weiss et al.

[11] Patent Number: 5,875,993
[45] Date of Patent: Mar. 2, 1999

[54] FLIGHT CONTROL OF AN AIRBORNE VEHICLE AT LOW VELOCITY

[75] Inventors: Haim Weiss, Haifa; Daniel G. Benshabat, Mobile Post Misgav, both of Israel

[73] Assignee: State of Israel/Ministry of Defense Armament Development Authority Rafael, Haifa, Israel

[21] Appl. No.: 891,040

[22] Filed: Jul. 10, 1997

[30] Foreign Application Priority Data

Jul. 17, 1996 [IL] Israel ........................................ 118883

[51] Int. Cl.[6] ........................................ F41G 7/00
[52] U.S. Cl. ........................................ 244/3.22; 244/3.15
[58] Field of Search ........................ 244/3.22, 3.21, 244/3.15, 164, 165

[56] References Cited

U.S. PATENT DOCUMENTS

| | | | |
|---|---|---|---|
| 4,742,356 | 5/1988 | Kuipers | 342/448 |
| 5,020,744 | 6/1991 | Schwarzschild | 244/164 |
| 5,082,202 | 1/1992 | Jacobson | 244/3.22 |
| 5,253,823 | 10/1993 | Lawrence | 244/3.15 |
| 5,259,569 | 11/1993 | Waymeyer et al. | 244/3.22 |
| 5,320,304 | 6/1994 | Danielson | 244/3.22 |
| 5,593,109 | 1/1997 | Williams | 244/3.21 |

OTHER PUBLICATIONS

Wie et al., "Quaternion Feedback Regulator for Spacecraft Eigenaxis Rotations" *J. Guidance* 12:375–380 (1989) May 1989.

Weiss, "Quaternion–Based Rate/Attitude Tracking System with Application to Gimbal Attitude Control" *Journal of Guidance, Control, and Dynamics* 16:609–616 (1993) July 1993.

*Primary Examiner*—Charles T. Jordan
*Assistant Examiner*—Theresa M. Wesson
*Attorney, Agent, or Firm*—Foley & Lardner

[57] ABSTRACT

A control system for controlling an airborne vehicle at a time of low aerodynamic moment is provided. The control system includes combined aerodynamic and thrust vector control actuators, a quaternion generator which determines a quaternion error value defining the error between the quaternion of the vehicle and the commanded quaternion; and a controller which controls the actuators based on the quaternion error value, an aerodynamic control gain and a thrust vector control gain.

15 Claims, 6 Drawing Sheets

5,875,993

FLIGHT CONTROL OF AN AIRBORNE VEHICLE AT LOW VELOCITY

FIELD OF THE INVENTION

The present invention relates to control and guidance systems generally and to control and guidance systems for low velocity flight, in particular.

BACKGROUND OF THE INVENTION

When a vehicle is flying at a low velocity, the various aerodynamic surfaces are not very effective. For example, when an airplane stalls, it is flying at such a low velocity that it becomes uncontrollable. A further example is that of a vertical launch of a missile from a ship or from a ground launcher. Vertical launches are desirable since the launching equipment takes far less space on the ship than if the missile were to be launched from a turret launcher and since the missile can turn to any direction, once it has cleared the superstructure of the ship.

FIG. 1, to which reference is now made, illustrates the flight of a missile 10 which is launched from a ship 12 having superstructure 14. In order to avoid the superstructure 14, the missile 10 must rise above the superstructure 14 and, only afterwards, turn towards the direction of the target 18. The missile 10 also reduces its altitude so that it comes to fly above sea level 19 at the same altitude as target 18. FIG. 1 illustrates the flight path of the missile.

FIG. 1 also shows a radar system 20, or any other tracking system, which tracks the target 18. It is typically desirable to have the missile 10 come to align its flight path with the target line of sight direction (i.e. the "boresight") of the radar system 20. The alignment is shown at 22.

The missile is first shot vertically out of the launcher 24, most of which is located below the deck, and the control system takes over only after a given period of time. Unfortunately, the missile is then flying at a low velocity, which is a relatively difficult state to control.

U.S. Pat. No. 5,082,202 describes a jet vane thrust vector control unit for use in steering a vertically launched missile during its turn towards alignment with the line of sight direction of the radar system 20. The control unit of U.S. Pat. No. 5,082,202 is jettisoned when it is no longer needed. U.S. Pat. No. 5,082,202 does not provide a control system for controlling the missile during the above-described initial launch stages.

SUMMARY OF THE PRESENT INVENTION

It is therefore an object of the present invention to provide a control and guidance system for turning a missile from its vertically launched direction to alignment with a line of sight direction of a tracking device, such as a radar system. In accordance with a preferred embodiment of the present invention, the control and guidance system includes a quaternion-based rate/attitude tracking system such that the control is performed via an "eigenaxis" rotation. The "eigenaxis" is the axis of rotation used to rotate one coordinate system (the missile body coordinate system) until it coincides with another (the line of sight coordinate system).

There is therefore provided, in accordance with a preferred embodiment of the present invention, a control system for controlling an airborne vehicle at a time of low aerodynamic moment. The control system includes a) combined aerodynamic and thrust vector control actuators, b) a quaternion generator which determines a quaternion error value defining the error between the quaternion of the vehicle and the commanded quaternion and c) a controller which controls the actuators based on the quaternion error value, an aerodynamic control gain and a thrust vector control gain.

Additionally, in accordance with a preferred embodiment of the present invention, the aerodynamic control gain is a velocity dependent gain function which changes state in accordance with the velocity of the vehicle.

Furthermore, in accordance with a preferred embodiment of the present invention, the thrust vector control gain is a time dependent function.

Still further, in accordance with a preferred embodiment of the present invention, the control unit adds the aerodynamic control gain and the thrust vector control gain to produce a control gain.

Moreover, in accordance with a preferred embodiment of the present invention, the vehicle is a missile. In that embodiment, the quaternion generator and the controller form an inner control loop providing commands to the actuators. The control system additionally includes a) an outer position control loop for controlling the linear position of the missile, b) a middle linear velocity control loop for controlling the linear velocity of the missile and c) an external roll command generator. The position loop, the velocity loop and the roll command generator generate the attitude commands $\psi_c, \theta_c, \phi_c$.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Reference is now made to FIGS. 2A, 2B, 3, 4A and 4B which illustrate the missile, the coordinate systems and the control and guidance system, respectively, of the present invention. Reference is also, again, made to FIG. 1 which is useful in understanding the operation of the present invention.

It will be appreciated that the control and guidance system provided herein can be utilized for all low velocity flight situations and is described herein, by example only, for a missile 10. The present invention is also operative for airborne vehicles with thrust vectoring control.

Figure 2A:
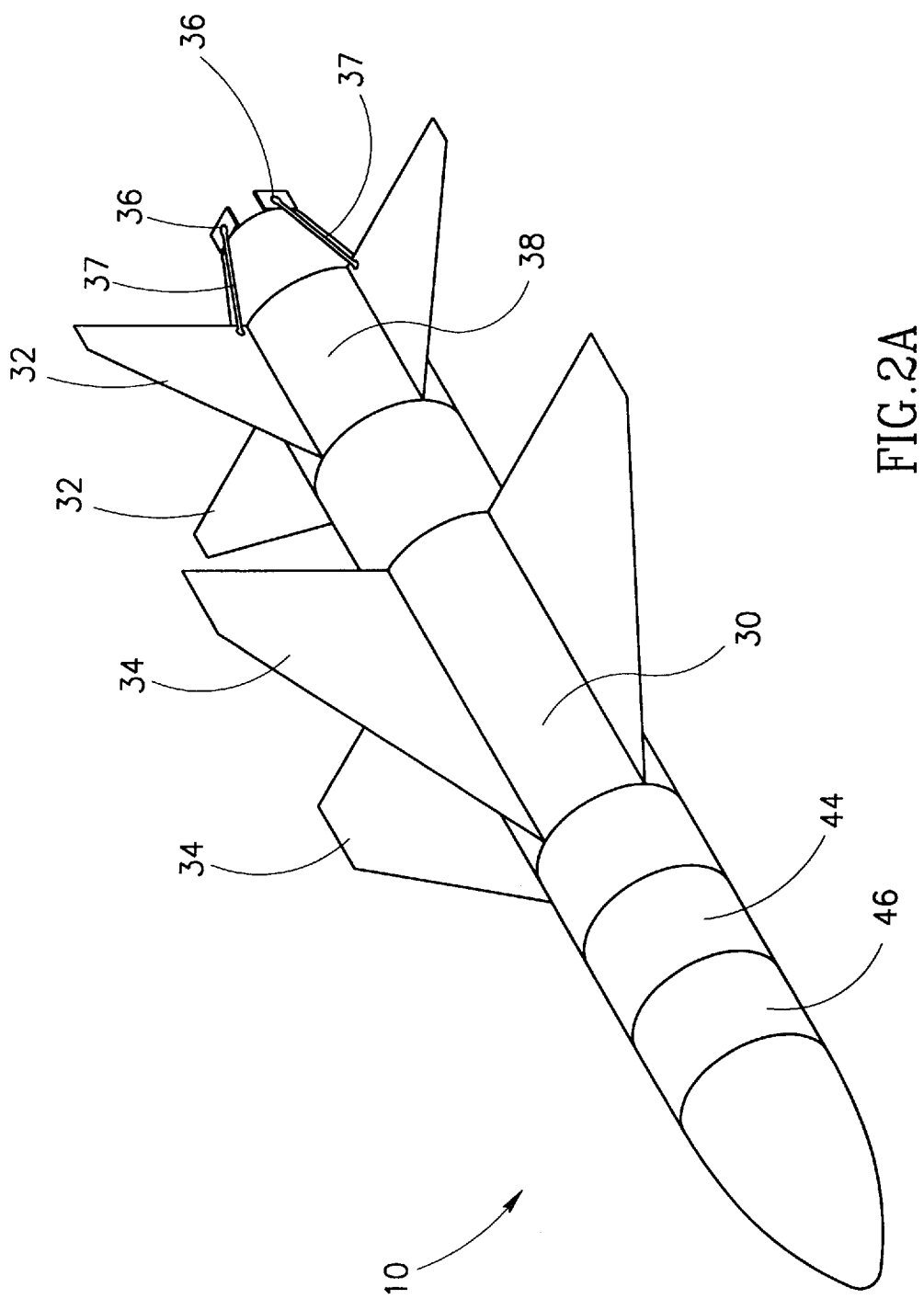
FIG. 2A is a schematic isometric illustration of the elements of the missile.
Figure 2B:
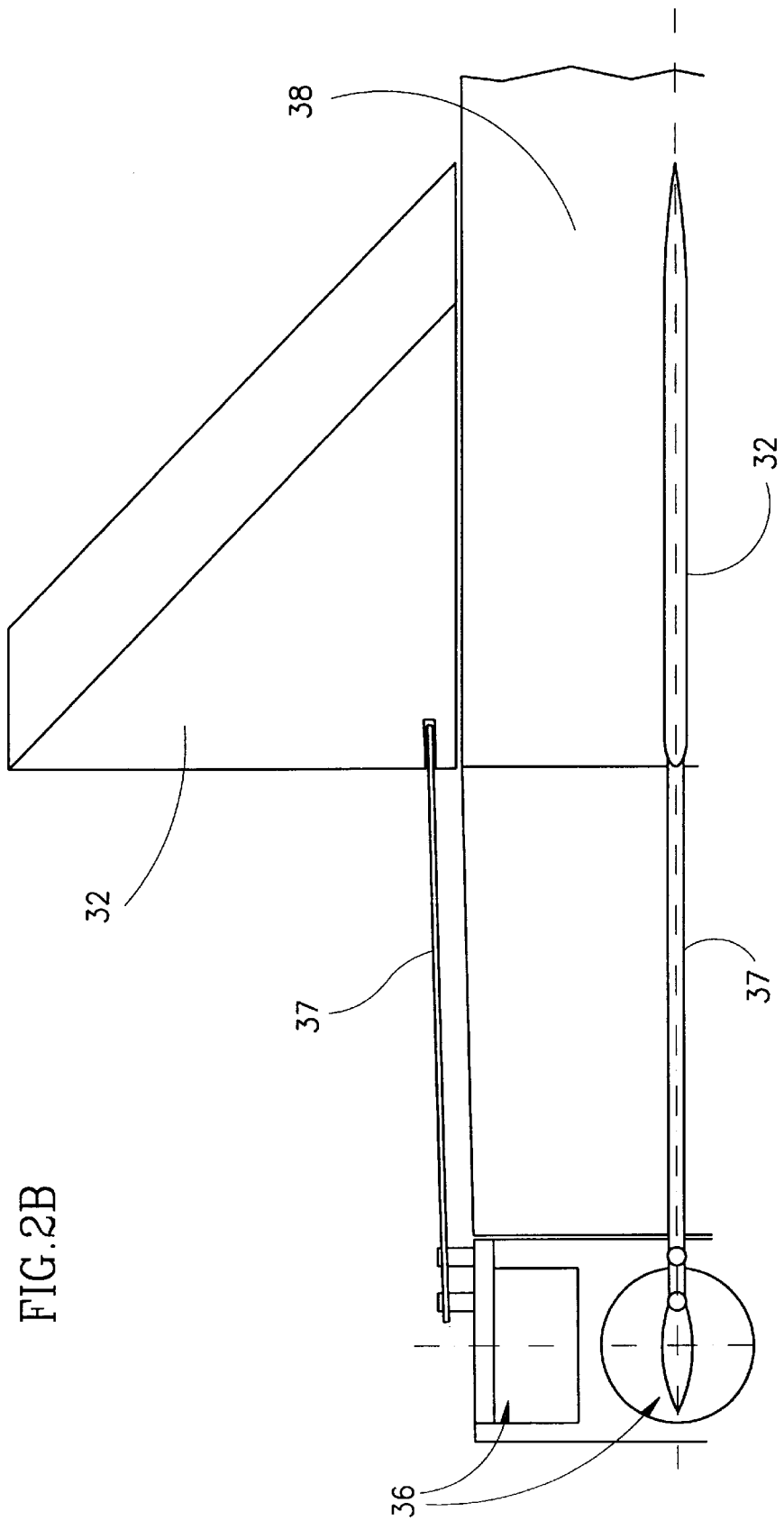
FIG. 2B is a schematic illustration of the steering fins and jet vanes of the missile of FIG. 2A.

FIG. 2A illustrates one such exemplary missile 10. The missile 10 includes a rocket motor 30, fins 32, wings 34, jet vanes 36 and servos 38 which rotate the jet vanes 36 and fins 32. The rocket motor 30 provides the thrust T for the missile 10 and each servo 38 directs the control surfaces of its corresponding fin 32 and the jet vane 36 so as to change the flight direction of the missile 10. In the exemplary missile of FIG. 2A, each steering fin 32 is controlled by its corresponding servo motor 38 and, as detailed in FIG. 2B, is connected, via a transmission rod 37, to a corresponding jet vane 36. The transmission rods 37 convert the angular movement of the steering fins 32 into deflection of the jet vanes 36 such that both operations occur simultaneously.

The jet vanes 36 are similar to those described in U.S. Pat. No. 5,082,202 or a similar device and are operative during the launch and leanover maneuver. Changing the angle of the jet vanes 36 (by changing the angle of the steering fins 32) creates a moment about the missile and changes the direction of motion of the missile. Thus, the jet vanes 36 can be controlled to turn the missile towards the line of sight direction. As the missile approaches the line of sight direction, the control and guidance system of the present invention minimizes the path angle y between the line of sight $X_{LOS}$ and the velocity vector V of the missile 10 such that the velocity vector V will eventually align along the line of sight $X_{LOS}$.

The missile 10 includes an inertial measurement unit (IMU) 44 which consists of three gyroscopes and three accelerometers. The IMU 44 measures the rate and acceleration, respectively, of the missile 10 within a "body" coordinate system 45 (FIG. 3) tied to the body of the missile 10, wherein the $X_B$ direction is along the longitudinal axis of the missile 10. Rotation about the body axes ($X_B$, $Y_B$, $Z_B$) respectively are noted by the angles ($\phi$, $\theta$, $\psi$), respectively, shown in FIG. 3.

Figure 3:
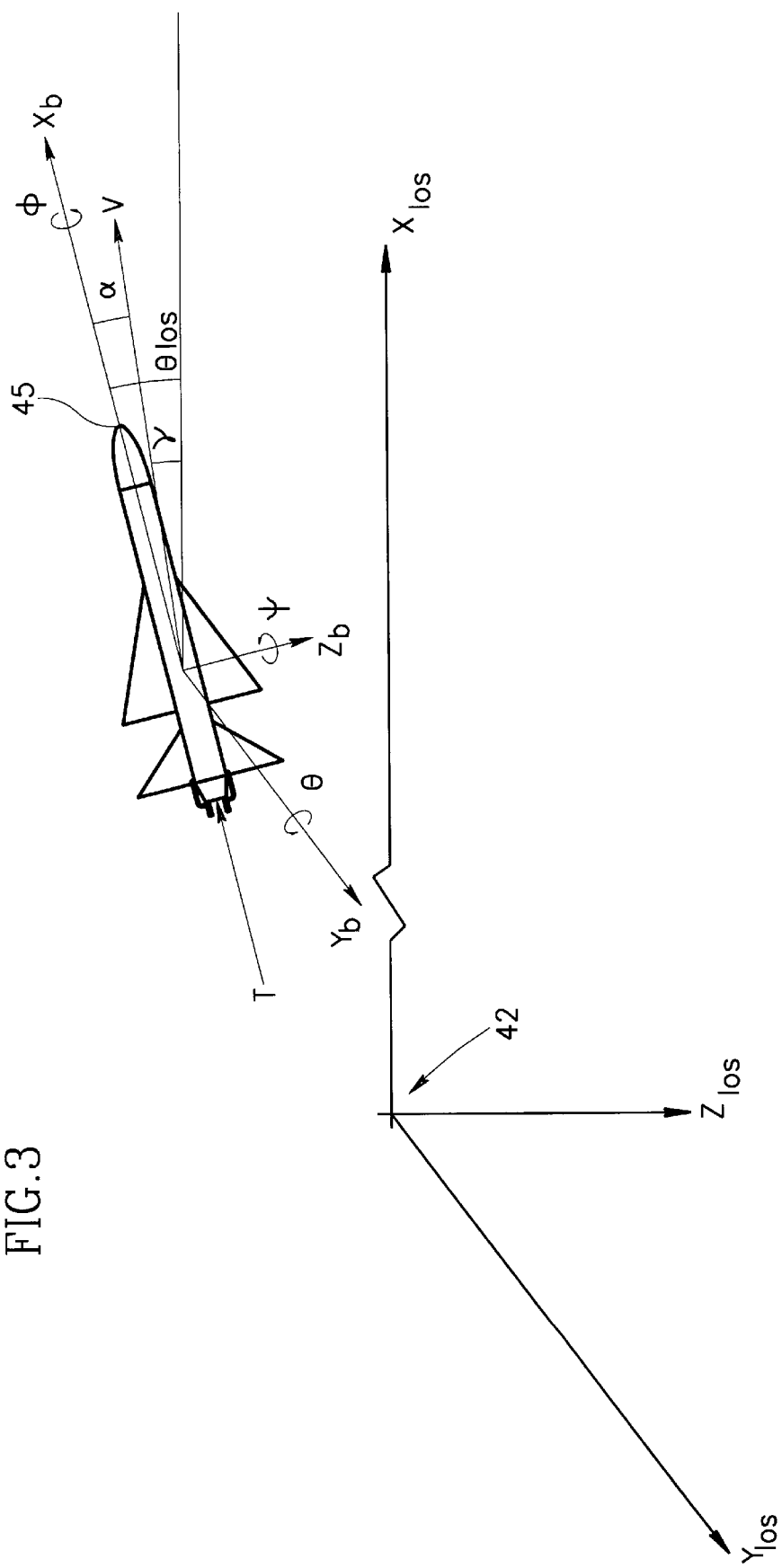
FIG. 3 is a schematic illustration of the missile and the line of sight coordinate systems used in the present invention.

The output of the IMU 44 is provided to a strapdown navigation system 46 which converts the body angular velocity and the linear acceleration data into position and velocity in the "LOS" coordinate system 42 (FIG. 3) of the radar system 20. Thus, as shown in FIG. 3, the $X_{LOS}$ axis is along the line of sight of the radar system 20, and the $Y_{LOS}$ and $Z_{LOS}$ axes are perpendicular to the $X_{LOS}$ axis. The LOS coordinate system 42 is a right-handed coordinate system.

The strapdown navigation system 46 also provides the body attitude expressed as a "quaternion", where the quaternion is a four-element parametrized vector which defines the attitude of a rigid body as a rotation about a single axis (called the "Euler" or "eigen" axis). The first three elements indicate the direction of the eigenaxis and the fourth element is a scalar related to the rotation angle about the eigenaxis. The four elements of the quaternion are defined as:

$q_i = c_i \cos(\mu/2)$, $i=1,2,3$     1

$q_4 = \cos(\mu/2)$     2 where $\mu$ is the magnitude of the eigenaxis rotation and the $c_i$ are the direction cosines of the Euler axis relative to the LOS coordinate system 42.

Figure 1:
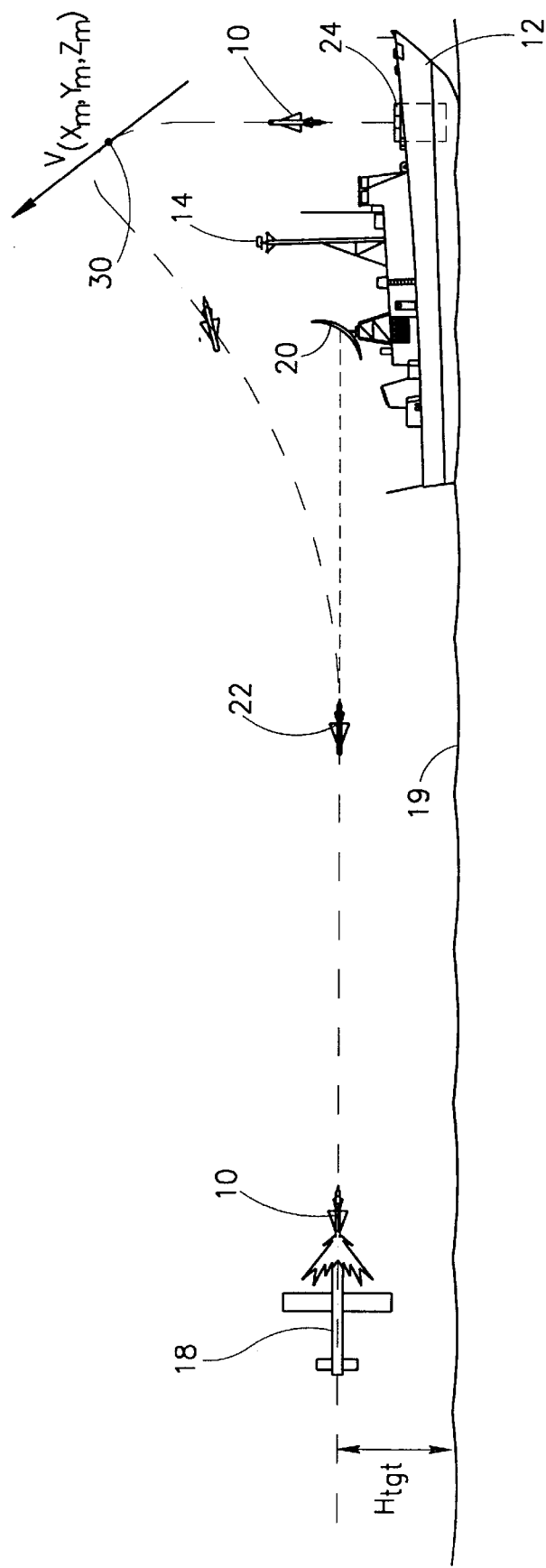
FIG. 1 is a schematic illustration of the flight of a missile launched from a boat, useful in understanding the present invention.

Assume that the missile 10 is at the point 30 of FIG. 1. It has a position ($X_m$, $Y_m$, $Z_m$) in the LOS coordinate system of FIG. 3 and a velocity vector V, as shown. Since the missile 10 is to, eventually, fly along the line of sight to the target, i.e. along the $X_{LOS}$ axis, the control and guidance system of the present invention operates to bring the positions ($Y_m$ and $Z_m$) of the missile 10 and the velocities ($\dot{Y}_m$ and $\dot{Z}_m$) with respect to the LOS coordinate system to 0. In other words, the missile 10 has to eventually fly along the $X_{LOS}$ axis (no Y or Z position) and not turn away from it (no velocity change, with respect to the LOS coordinate system 42, along the Y or Z axes). In addition, the path angle y (FIG. 3) between the flight direction of the missile 10 and the $X_{LOS}$ axis has to be brought to 0.

Figure 4A:
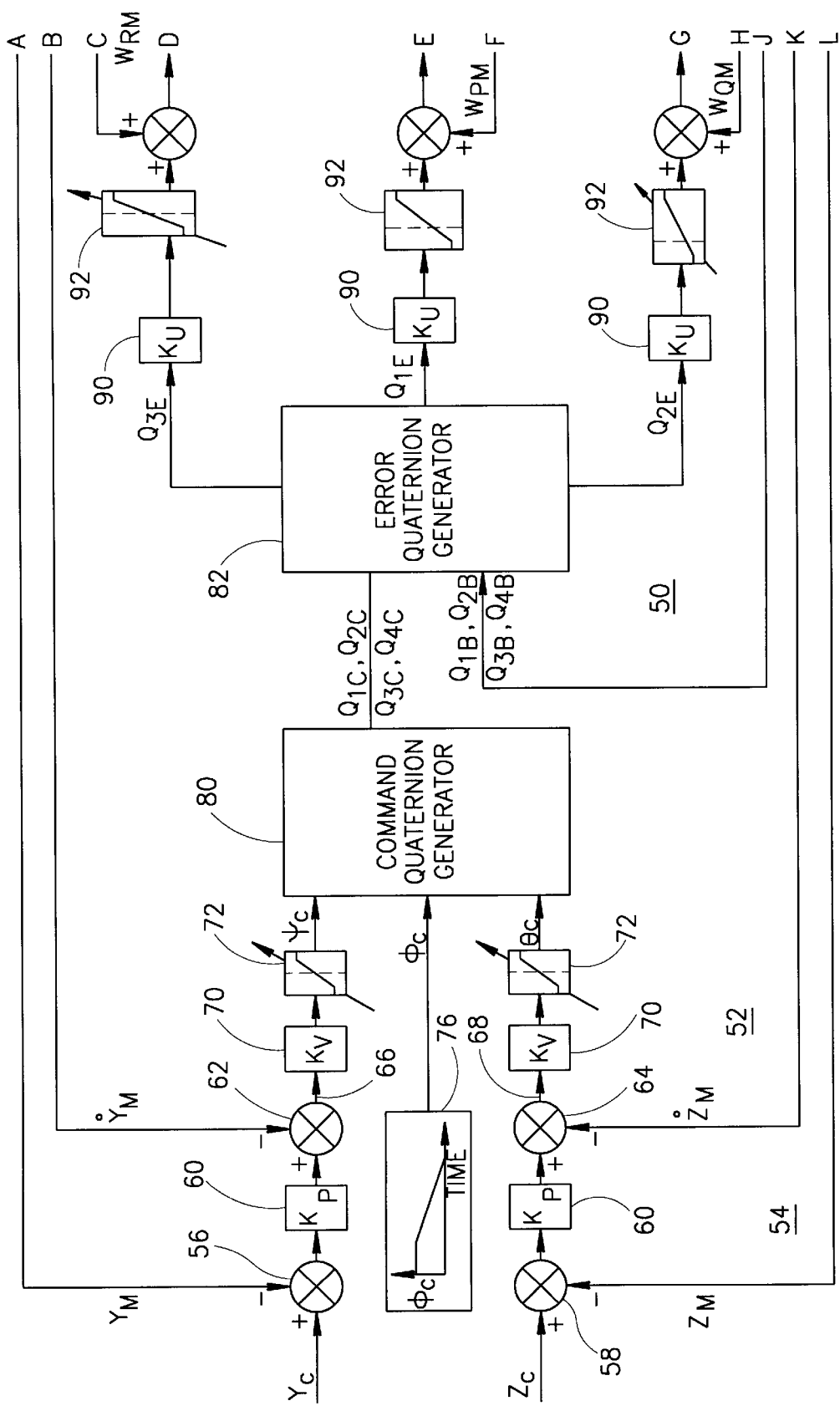
FIGS. 4A and 4B together are a block diagram illustration of the control and guidance system of the present invention.
Figure 4B:
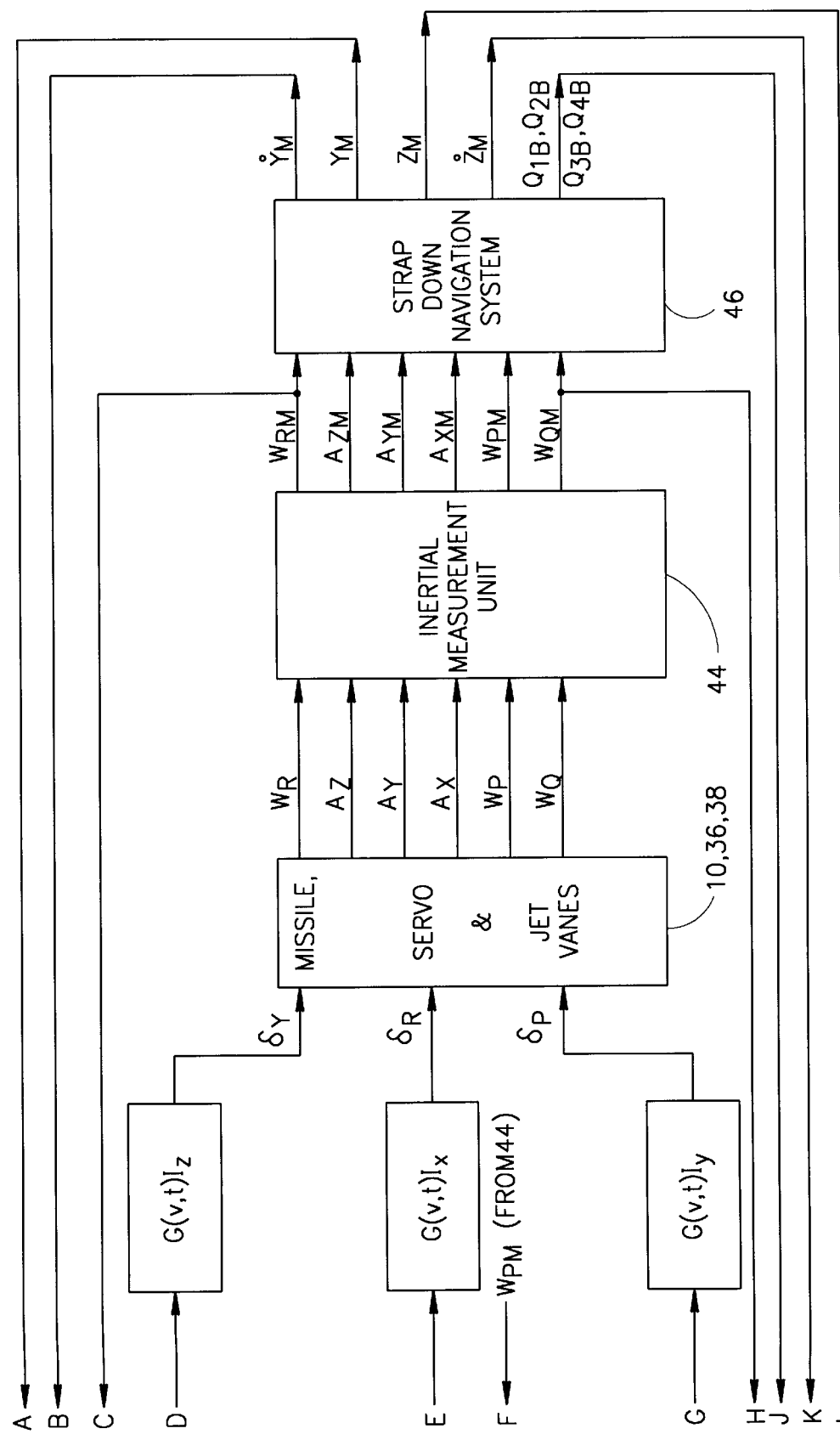

The control and guidance system of FIGS. 4A and 4B assumes that the missile will rise vertically, with no control, for a given length of time. At that point, the control and guidance system takes over and zeroes the position and velocity of the missile 10 with respect to the LOS coordinate system 42 in the directions perpendicular to $X_{LOS}$, and the path angle y, as defined hereinabove.

The control and guidance system is illustrated in FIGS. 4A and 4B. The input signals $Y_c$ and $Z_c$, in the LOS coordinate system 42, are the external control signals defining the trajectory which the missile 10 is to follow. For the present example, the control signals indicate that the missile is to fly vertically for a predetermined time interval and then follows a trajectory which avoids the superstructure 14. Following that, the control signals are 0, since the missile is to converge on the $X_{LOS}$ direction.

In accordance with a preferred embodiment of the present invention, the control and guidance system controls the quaternion of the missile 10, thereby to provide rotation about a single axis and thus, to minimize the convergence time and the control effort. Discussion of quaternion control and guidance systems, designed for spacecraft, is provided in the articles:

"Quaternion Feedback Regulator for Spacecraft Eigenaxis Rotation", by B. Wie, H. Weiss and A. Arapostathis, *Journal of Guidance, Control and Dynamics*, Vol. 12, No. 3, May–June 1989, pp. 375–380; and "Quaternion-Based Rate/Attitude Tracking System with Application to Gimbal Attitude Control", H. Weiss, *Journal of Guidance, Control and Dynamics*, Vol. 16, No. 4, July–August 1993, pp. 609–616.

The articles also discuss the stability requirements of such control and guidance systems and are incorporated herein by reference.

As will be described hereinbelow, in accordance with a preferred embodiment of the present invention, the quaternion control loop combines thrust vector control (as provided by the jet vanes 36) with aerodynamic control (as provided by the steering fins 32) since the servos 38 control the steering fins 32 and the jet vanes 36 together. For this particular embodiment of the present invention, both the position and velocity in the LOS coordinate system and relative to it must also be controlled, thereby to bring the missile 10 to the $X_{LOS}$ axis. Thus, the control and guidance system has three control loops, an inner loop 50 controlling the quaternion error, a middle loop 52 controlling the velocity and an outer loop 54 controlling the position. As mentioned hereinabove, the strapdown navigation system 46 measures the position ($Y_m$, $Z_m$), the velocity ($\dot{Y}_m$, $\dot{Z}_m$) and the body quaternion $Q_B$ of the missile 10 at the current time. It provides these outputs, respectively, to the three loops 54, 52 and 50, as shown.

The input signals $Y_c$ and $Z_c$ are provided to summers 56 and 58 forming part of the outer loop 54. Summers 56 and 58 subtract the current position $Y_m$ and $Z_m$, respectively, from the input signals $Y_c$ and $Z_c$ to produce error signals which are to be zeroed. The error signals pass through amplifiers 60, having a value $K_p$, to provide velocity control signals to the middle loop 52.

For the middle loop 52, the velocity values $\dot{Y}_m$ and $\dot{Z}_m$ are subtracted from their respective velocity control signals by summers 62 and 64, respectively, to produce velocity error signals, at 66 and 68, respectively. The velocity error signals 66 and 68 are amplified by amplifiers 70, having a value $K_v$, and then are limited by limiters 72 thereby to produce the body angle command signals. When the velocity error signal is so large that the limiters 72 are in their saturation state, the limiters 72 provides the same signal regardless of the error velocity signal. In this situation, which typically occurs during the initial phase of the flight, the missile 10 is only controlled by the inner, quaternion control loop 50.

The output of the limiters 72 is defined as the body yaw and pitch commands ($\psi_c$, $\theta_c$). As illustrated in FIG. 4A, the Z axis calculations provide $\theta_c$ and the Y axis calculations provide $\psi_c$. In addition, $\phi_c$ is provided externally as a function of time, as shown at 76. Limiters 72 ensure that the values for the body angles $\psi$ and $\theta$ are within the allowable boundaries such that the resultant angle of attack is low.

The three body angle command signals are provided to a command quaternion generator 80 which generates therefrom the command quaternion $Q_c$, a four-element vector. Command quaternion generator 80 performs standard conversion operations from body angles ($\phi_c$, $\psi_c$, $\theta_c$) to a quaternion $Q_c$. The conversion operation is as follows:

$$Q_c = Q_\psi Q_\theta Q_\phi \qquad 3$$

$$Q_\psi = [0 \quad 0 \quad \sin(\psi_c/2) \quad \cos(\psi_c/2)]^T$$

$$Q_\theta = [0 \quad \sin(\theta_c/2) \quad 0 \quad \cos(\theta_c/2)]^T$$

$$Q_\phi = [\sin(\phi_c/2) \quad 0 \quad 0 \quad \cos(\phi_c/2)]^T$$

where multiplication of two quaternions Q and P is performed as follows:

$$QP = \begin{bmatrix} q_4 & -q_3 & q_2 & q_1 \\ q_3 & q_4 & -q_1 & q_2 \\ -q_2 & q_1 & q_4 & q_3 \\ -q_1 & -q_2 & -q_3 & q_4 \end{bmatrix} \begin{bmatrix} p_1 \\ p_2 \\ p_3 \\ p_4 \end{bmatrix} \qquad 4$$

A quaternion error generator 82 produces a quaternion error signal, denoted $Q_E$, from the measured body quaternion $Q_B$ and the command quaternion $Q_C$ in accordance with the following equation:

$$Q_E = Q^*_c Q_B \qquad 5$$

$$\begin{bmatrix} q_{1E} \\ q_{2E} \\ q_{3E} \\ q_{4E} \end{bmatrix} = \begin{bmatrix} q_{4c} & q_{3c} & -q_{2c} & -q_{1c} \\ -q_{3c} & q_{4c} & q_{1c} & -q_{2c} \\ q_{2c} & -q_{1c} & q_{4c} & -q_{3c} \\ q_{1c} & q_{2c} & q_{3c} & q_{4c} \end{bmatrix} \begin{bmatrix} q_{1B} \\ q_{2B} \\ q_{3B} \\ q_{4B} \end{bmatrix} \qquad 6$$

where $Q_c^*$ denotes the adjoint command quaternion. The quaternion error signal $Q_E$ indicates the current attitude between the body coordinate system 45 and the line of sight coordinate system 42 and is the signal which is processed in order to produce the control signals to the servo 38.

As can be seen in FIG. 4A, the three quaternion error signals, $Q_{1E}$, $Q_{2E}$ and $Q_{3E}$ are separately controlled but the operations for each one are similar and therefore, only one path, that of $Q_{1E}$, will be discussed in detail.

The error signal $Q_{1E}$ is amplified by an amplifier 90 having a value of $K_u$ and the result is limited by a limiter 92 to be within the dynamic range of the rate gyros of the IMU 44. To this resultant value is added the measured angular velocity $W_{PM}$ about the $X_B$ direction, as provided by the IMU 44. The resultant value is amplified by $G(v,t)I_x$, where $I_x$ is the moment of inertia about the $X_B$ direction. Typically, $G(v,t)$ is a gain function having scheduled changes based on the speed v of the vehicle and the time, t, from launch. $G(v,t)$ is defined as follows:

$$G(v,t) = \frac{-D}{K\_AERO\_L(v) + K\_THRUST\_L(t)} \qquad 7$$

where K_AERO_L(v) is an aerodynamic gain which increases with the speed v, K_THRUST_L(t) is a thrust vector gain which changes with time from launch and D is a damping coefficient.

It will be appreciated that the gain function G(v,t) integrates the gain function K_THRUST_L(t) of a thrust vector control system with the gain function K_AERO_L (v) of an aerodynamic control system. When the velocity is very low, the control moment is primarily provided by the thrust of the rocket motor 30. When the velocity is higher, the aerodynamic control surfaces operate and thus, they dominate the control moment. In between these two states, the present control system provides a smoothly varying function which utilizes both control operations.

The resultant signal is the control signal $\delta_R$ to servo 38, for the roll (R) direction.

The error signal $Q_{2E}$ is combined with the angular velocity measurement $W_{QM}$ and the result is multiplied by a gain of $G(v,t)I_y$ thereby to produce the pitch control signal $\delta_p$. The error signal $Q_{3E}$ is combined with the angular velocity measurement $W_{RM}$ and the result is multiplied by a gain of $G(v,t)I_z$ thereby to produce the yaw control signal $\delta_y$.

It will be appreciated that the values of $K_u$ and D define the character of the control system (i.e. the extent of the damping it provides and the bandwidth of its response) and are selected in accordance with standard control practice to ensure stability and robustness of the control and guidance system, taking into account the dynamics of the missile 10 at low velocity.

The servo 38 directs the missile in the direction indicated by the control signals it receives and the resulting acceleration and angular velocity are measured by the IMU 44 as (Ax, Ay, Az) and ($W_{RM}$, $W_{PM}$, $W_{QM}$) respectively. As mentioned hereinabove, the output of the IMU 44 is processed by the strapdown navigation system 46 to produce the measured LOS position and relative velocity and the measured body quaternion, all of which are provided as feedback to control loops 50, 52 and 54.

It will be appreciated that, by utilizing quaternion control, the control and guidance system of the present invention provides simultaneous control around the three body axes of coordinate system 40. In addition, since the quaternion control causes rotation about the eigenaxis, there is minimal control effort and therefore, minimal usage of fuel and minimal convergence time to the LOS direction.

It will be appreciated by persons skilled in the art that the present invention is not limited to what has been particularly shown and described hereinabove. Rather the scope of the present invention is defined by the claims which follow:

We claim:

1. A control system for controlling an airborne vehicle at a time of low aerodynamic moment, the control system comprising:
   a. a plurality of actuators;
   b. combined aerodynamic and thrust vector control surfaces controlled by said actuators;
   c. means for determining a quaternion error value defining the error between a quaternion of the vehicle and a commanded quaternion; and
   d. control means for controlling said actuators based on said quaternion error value, an aerodynamic control gain and a thrust vector control gain.

2. A control system according to claim 1, wherein said aerodynamic control gain is a velocity dependent gain function which changes state in accordance with the velocity of said vehicle.

3. A control system according to claim 2, wherein said control means adds said aerodynamic control gain and said thrust vector control gain to produce a control gain for said control means.

4. A control system according to claim 3, wherein said vehicle is a missile, and wherein said means for determining and said control means form an inner control loop providing commands to said actuators, and wherein said control system additionally comprise:
 a. an outer position control loop for controlling the linear position of said missile;
 b. a middle linear velocity control loop for controlling the linear velocity of said missile and for generating pitch and yaw commands; and
 c. an external roll command generator for generating roll commands.

5. A control system according to claim 2, wherein said thrust vector control gain is a time dependent function.

6. A control system according to claim 5, wherein said control means adds said aerodynamic control gain and said thrust vector control gain to produce a control gain for said control means.

7. A control system according to claim 6, wherein said vehicle is a missile, and wherein said means for determining and said control means form an inner control loop providing commands to said actuators, and wherein said control system additionally comprises:
 a. an outer position control loop for controlling the linear position of said missile;
 b. a middle linear velocity control loop for controlling the linear velocity of said missile and for generating pitch and yaw commands; and
 c. an external roll command generator for generating roll commands.

8. A control system according to claim 5, wherein said vehicle is a missile, and wherein said means for determining and said control means form an inner control loop providing commands to said actuators, and wherein said control system additionally comprises:
 a. an outer position control loop for controlling the linear position of said missile;
 b. a middle linear velocity control loop for controlling the linear velocity of said missile and for generating pitch and yaw commands; and
 c. an external roll command generator for generating roll commands.

9. A control system according to claim 2, wherein said vehicle is a missile, and wherein said means for determining and said control means form an inner control loop providing commands to said actuators, and wherein said control system additionally comprises:
 a. an outer position control loop for controlling the linear position of said missile;
 b. a middle linear velocity control loop for controlling the linear velocity of said missile and for generating pitch and yaw commands; and
 c. an external roll command generator for generation roll commands.

10. A control system according to claim 1, wherein said thrust vector control gain is a time dependent function.

11. A control system according to claim 10, wherein said control means adds said aerodynamic control gain and said thrust vector control gain to produce a control gain for said control means.

12. A control system according to claim 11, wherein said vehicle is a missile, and wherein said means for determining and said control means form an inner control loop providing commands to said actuators, and wherein said control system additionally comprises:
 a. an outer position control loop for controlling the linear position of said missile;
 b. a middle linear velocity control loop for controlling the linear velocity of said missile and for generating pitch and yaw commands; and
 c. an external roll command generator for generating roll commands.

13. A control system according to claim 10, wherein said vehicle is a missile, and wherein said means for determining and said control means form an inner control loop providing commands to said actuators, and wherein said control system additionally comprises:
 a. an outer position control loop for controlling the linear position of said missile;
 b. a middle linear velocity control loop for controlling the linear velocity of said missile and for generating pitch and yaw commands; and
 c. an external roll command generator for generation roll commands.

14. A control system according to claim 1, wherein said vehicle is a missile.

15. A control system according to claim 14, wherein said means for determining and said control means form an inner control loop providing commands to said actuators and wherein said control system additionally comprises:
 a. an outer position control loop for controlling the linear position of said missile;
 b. a middle linear velocity control loop for controlling the linear velocity of said missile and for generating pitch and yaw commands; and
 c. an external roll command generator for generating roll commands.

* * * * *